July 2, 1968 C. D. HOFMANN 3,390,683

DATA ACCESS MEANS

Filed Oct. 5, 1966 2 Sheets-Sheet 1

INVENTOR.
CHARLES D. HOFMANN

BY Angus & Mon

ATTORNEYS.

DATA ACCESS MEANS

Filed Oct. 5, 1966 2 Sheets-Sheet 2

INVENTOR.
CHARLES D. HOFMANN
BY Angus & Mon
ATTORNEYS.

3,390,683

DATA ACCESS MEANS

Charles D. Hofmann, Santa Barbara, Calif., assignor to Computer Accessories Corporation, Santa Barbara, Calif., a corporation of California Filed Oct. 5, 1966, Ser. No. 584,548
7 Claims. (Cl. 129—16.1)

ABSTRACT OF THE DISCLOSURE

This invention relates to the handling of data-bearing cards, and in particular to means for removing selected cards from a stack by the use of gas pressure thereon, which expels a card not restrained in its holder. A feature of the invention is the provision of a gas pressure which maintains the stack in a nearly weightless condition, and an expulsive gas pressure above that first-named level to expel the desired card.

This invention relates to the handling of data-bearing cards.

In many fields, including but not limited to the field of computer operations, data is stored on cards to which access is had for the use of the data which they carry. In computers, the cards generally bear a surface of a magnetizable material. However, the utility of this invention is not limited to media in which magnetic properties are used. The invention is useful also, for example, in connection with cardboard or plastic cards which bear microfilm and the like. This invention is applicable for the handling of all types of data which can be attached to or be incorporated in relatively flat structures. Whether the data is carried inherently in the material of the card, or by something attached to it, or by something carried within it, is of no importance.

Data carrying cards are customarily stored in stacks. Then the problem of selecting a designated card from the stack arises which is a first limitation on the system. If the card must be returned to the location from which it was extracted, then a second limitation arises. Both limitations involve the risk of error in selection or refiling the cards. To overcome these limitations, attempts have been made to devise systems in which it is possible to select a designated card from among a randomly distributed group of cards by holding all but the selected one of the cards and exerting inertial forces on the entire stack so as to shake the selected card free of the stack. The requirements for inertial effects require cards of substantial mass, and a substantial path length of movement. The first limitation comprises an inherent limitation on the type of storage means which can be used, in that significant mass must be provided, and the second limitation enlarges the machinery and the total path length the card must travel, thereby lengthening the cycle time.

It is an object of this invention to provide apparatus in which cards may be stacked in a random array and from which they may be extracted and to which they may be returned as desired. It is a further object of this invention to accomplish these objectives using any relatively flat medium of storage, relying on positive expulsive fluid forces without the requirement for mass, or for any motion at all of the holder in which the cards are contained at the time of selection.

Apparatus according to this invention is adapted to select and eject a designated card from among a stacked group of cards. The term "card" is used in its broadest connotation, and describes a structure having a dimension of length, width and thickness, with a pair of parallel edges lying parallel to the ejection axis, a pair of spaced-apart parallel faces lying parallel to the ejection axis, and bounding at least a portion of the region between these edges. The cards are stacked in face-to-face contiguity, with the said edges aligned, each card incorporating therein retention means respective to itself. Such retention means may, for example, comprise binary coded groups of holes and openings through the cards from the holes to said edges, whereby a given code designation is respectively only to an individual one of said cards, so that it, and it alone, can be removed from among a group of cards when associated mechanism is set to that designation.

The apparatus itself comprises a holder for holding the stack of cards, comprising four joined wall members which lie parallel to the ejection axis with a closure member which closes one end of the structure formed by the wall members. This forms an open-ended holder in which the cards lie in close but not binding relationship with each other, and with the boundaries of the stack itself in close but not binding relationship with the wall members. The stack forms a power chamber with the wall members adjacent to the closure member. A conduit enters into the power chamber, and valve means controls the passage of gas under pressure through the conduit from a source of said gas. A steady gas pressure is maintained in the power chamber at a pressure sufficient to maintain the stack of cards in a nearly weightless condition.

Restraint means is connected to the holder and includes a plurality of engagement means, the engagement means being adapted to engage respective ones of the retention means on the cards. Selector means is connected to the restraint means for selecting and causing engagement means to engage respective retention means which will restrain to the holder all but the designated one of said cards, whereby passage of gas under suitable pressure into the power chamber will force the designated card out of the holder, the card acting as a piston.

According to a preferred but optional feature of the invention, the engagement means comprises a pin axially movable laterally relative to the ejection axis, whereby to engage the retention means.

According to another preferred embodiment of the invention, a ditherer is inserted in the conduit so that there is a continuous pulsation of the gas pressure in the power chamber at levels below that which would cause expulsion of a card.

The above and other features of the invention will be fully understood from the following detailed description and the accompanying drawings in which.

Figures 1, 2, 3, 4, 5:
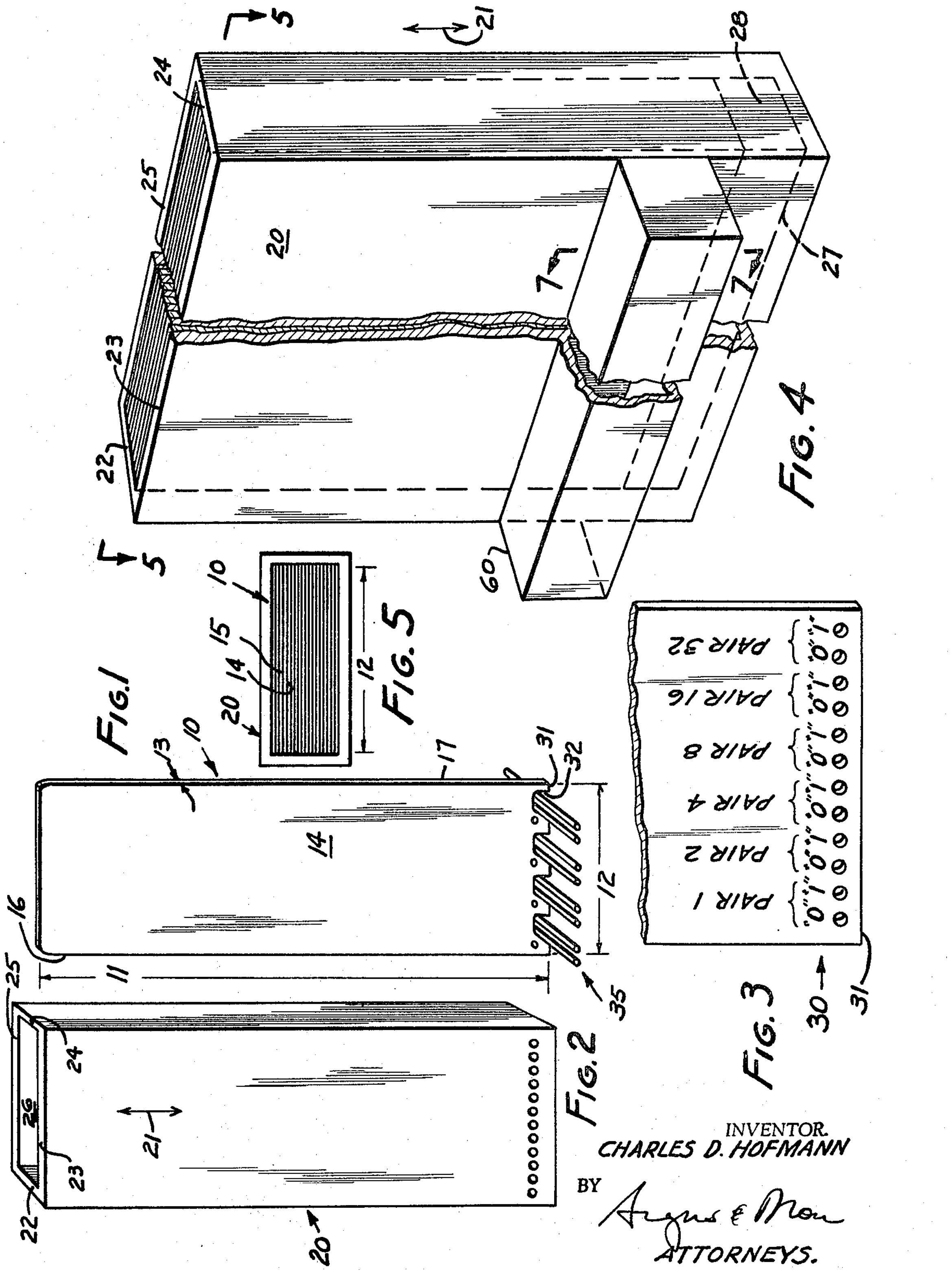
FIG. 1 is a perspective view of a form of card useful in the invention together with schematic showing of engagement means useful therewith.
FIG. 2 is a perspective view of a holder useful with the invention.
FIG. 3 is a schematic illustration of the scheme of the retention means on the card of FIG. 1.
FIG. 4 is a perspective view showing a stack of cards of the type shown in FIG. 1 inserted in the holder of FIG. 2.
FIG. 5 is a top view taken at line 5—5 of FIG. 4.

FIGS. 1–3 show the selection technique of the invention and disclose a coded card 10 having dimensions of length, width and thickness, 11, 12, 13 respectively. Data which may be in magnetic form or otherwise, is stored on the area defined by the length and the width. The card has a pair of faces 14, 15 which are at least partially defined by edges 16, 17. It is to be understood that faces 14, 15 need not be continuous, and in fact may be recessed or even cut out so as to accept inserts with as microfilm or magnetizable media which might be of lesser thickness than dimension 13. However, the cards when they lay in a stack will be in face-to-face contiguity, and substantial portions of these faces will abut so as to form a restricted passage for fluid between the adjacent cards.

The cards are stored in a holder 20 which holder has an ejection axis 21. The holder is formed of four wall members, 22, 23, 24, 25 which are joined together to form a prismatic structure with an open end 26. A closure member 27 seals the bottom end of the holder by being joined to all four wall members. A power chamber 28 is formed beneath the stack of cards by the bottom portions of the wall members, the closure member, and the stack. A group of rests 29 are provided to support the stack above the closure member.

As can be seen in FIG. 5, a stack of cards 10 substantially completely fills the lateral cross-section of the holder. The cards are in close fitting but not binding relationship with the holder and with each other so that an expulsive force can cause the card to be expelled but without excessive leakage of air.

In order to code the card, a simple binary technique can be utilized. The preferred code is shown in FIG. 3. As illustrated therein, six pairs of hole locations provide for a six-bit binary number. There are twelve code hole positions 30 possible near a restraint edge 31 of the cards, which edges lie next to each other. It will also be noted in the stacks that edges 16 and 17 are generally aligned in the stack. For a selected card to escape, there needs to be at restraint edge 31 a slot or other means where a pin might be exerted. Such an arrangement will permit the escape of the card bearing the correct code. There also must be some closed holes which would be engaged by the restraint means to prevent the escape of all other cards, the restraint means fitting in at least one of these holes to hold these cards.

For example, in FIG. 1 there is shown a card which is able to escape from the stack. Code hole locations are disposed equidistant from each other, and the holes are intended to be equal in diameter. The hole locations are grouped in pairs as best shown in FIG. 3, and it is stipulated that in any pair, one hole will be closed and the other will be accessed (open) as by slot 32 (sometimes called an "opening"). Engagement means inserted in a closed hole will hold the card in a stack. Engagement means in an accessed hole (or slot) will not hold the card.

Each card will be issued a serial number for convenience, starting from 0 and ending at number $n-1$. For maximum economy of the commonly available mechanisms, the total number of cards $n$ will be an integral power of 2, thus $n=2p$, $p$ being the number of pairs of hole location. In FIG. 2 $p=6$.

The combination of closed or accessed hole is formed by expressing the number of each card in binary form and accessing either the 1 or the 0 hole of each pair as the case may be. In the illustration of FIG. 1, the card bearing the coded number 21 is expressed in binary form as $32(0)+16(1)+8(0)+4(1)+2(0)+1(1)$, hence the accessed holes are formed as shown. With engagement means 35 in the position shown, this card with its coded number 21 will be able to escape. Every other card will, however, have one of the engagement means passing through some hole. Each of the other cards will therefore be retained. To make for better clearances, regions between adjacent pairs of access holes are removed. Because only the closed holes function to retain the cards, this removal of card material is of no function significance to retention.

Figures 6, 7, 8, 9:
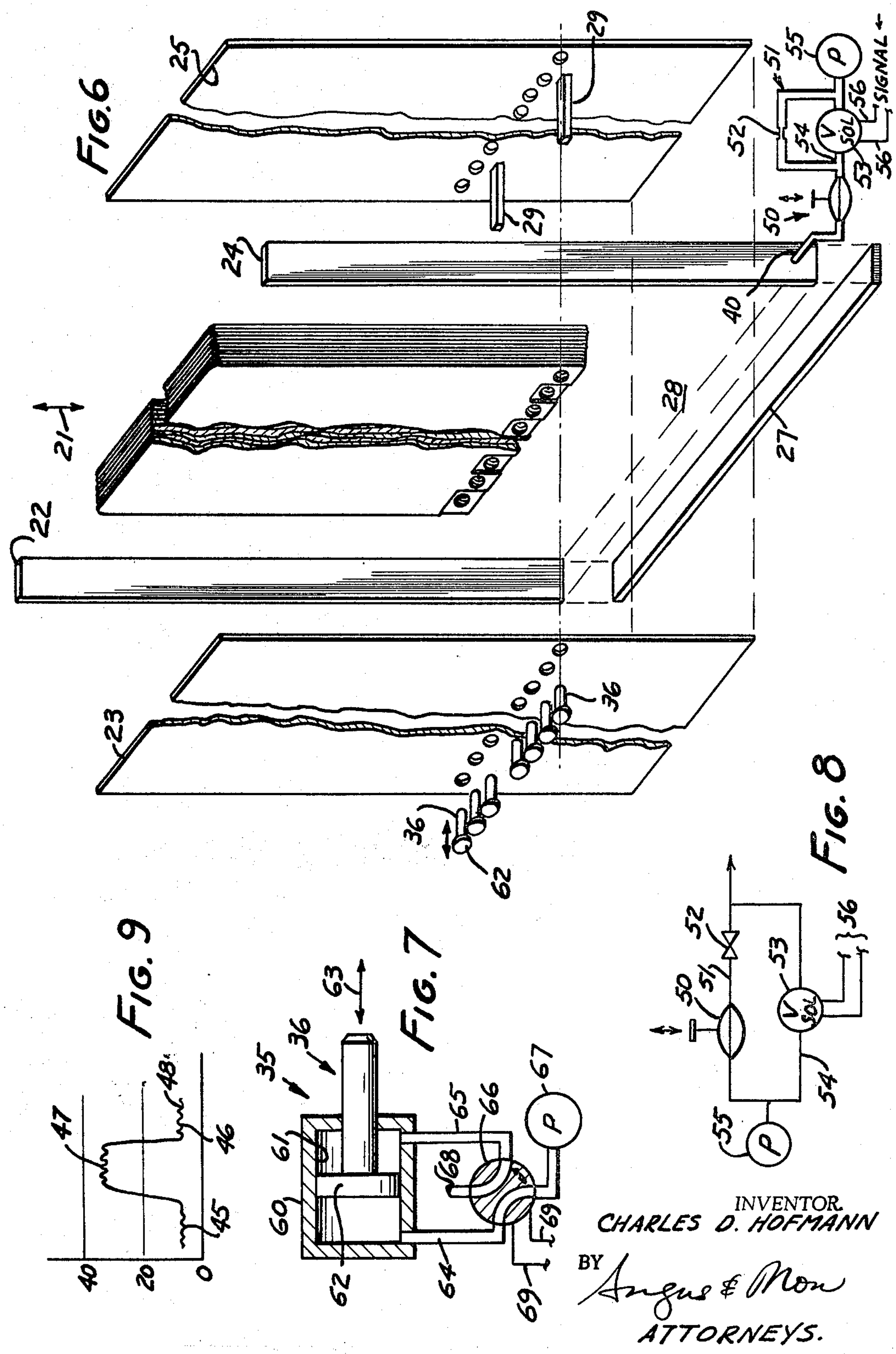
FIG. 6 is an exploded view of parts of FIG. 4.
FIG. 7 is a side view partly in cutaway cross-section taken at line 7—7 of FIG. 4.
FIG. 8 is a schematic illustration of an alternate fluid control system useful in the device of FIG. 4.
FIG. 9 is a graph showing the scheme of pressure application in the device of FIG. 4.

The engagement means is provided in the form of shiftable pins 36 (FIGS. 6 and 7). There are $2p$ of these pins, one for each hole location. They are inserted or removed by means which is yet to be described. These pins may be inserted or removed to form a binary coded number. Thus, it will be evident that when a coded edge accessed to correspond to the selected pin code is met by these pins, that card and no other card will be free. No other card can be free, because at least one of these pins will engage every other card at a closed hole and hold it in the holder. This is the scheme of the card and the restraint code technique. The remaining portions of the invention relate to means readily to extract the card from the holder.

Conduit 40 enters power chamber 28. The purpose of the conduit in this arrangement is to convey to the power chamber (1) a continuous force which will maintain the stack of cards in a nearly "weightless" condition, and (2) a periodic burst of additional pressure which, when the selection has been made, will give sufficient force to expel the released card from the stack. This pressure sequence is shown graphically in FIG. 9 where segments 45 and 46 of the graph indicate a base level of pressure expressed in pounds per square inch which will generally support the stack in nearly "weightless" condition, and another segment 47 indicative of a pressure which will expel the free card from the stack. It will be noted that the pressure line is modified by waviness as indicated by numeral 48 which indicates the action of a ditherer which imposes an alternating pressure on the basic pressure wave. The alternations of the pressure wave are not sufficient to cause any operative effect on the card in the sense of either expelling or not expelling the card, but it does serve to keep the stack "alive" so that stick-slip effects will be overcome. This alternating effect is optional. Steady pressures are also suitable.

The basic control of the pressure actuation is best shown in FIG. 6 wherein a ditherer 50 comprising a typical diaphragm-type plunger-operated device operates on the flow in the conduit so as to create the fluctuating effects heretofore described. Preferably, the basic pressure is applied through a branch 51 of the conduit which flows through an orifice 52, thereby giving a steady flow which maintains a pressure within the power chamber which is sufficient to keep the stack generally supported lightly on supports 29, and replaces leakage. An electrically actuated solenoid type off-on valve 53 is connected in a second branch 54 of the conduit, and both are supplied from a pressure source 55 such as a compressor, gas flask, or the like.

The solenoid valve receives a signal from leads 56 and, when the valve is open, provides a pressure rise such as shown by segment 47 of the graph in FIG. 9. When valve 53 is closed, the pressure bleeds off to the level generally indicated by segments 45 and 46. In this embodiment, the entire pressure output is provided with the undulating signal.

FIG. 8 shows an alternate circuit wherein the pressure source 55 includes the same branches 51 and 54, but in this case the ditherer 50 is incorporated in the same branch as the orifice 52. On the other hand, branch 54 which includes solenoid valve 53, is separately supplied so that the dithering effect is applied only to the constant flow through the orifice and not to the entire flow.

The operation of the restraint means in this construction will be best understood by reference to FIGS. 6 and 7. FIG. 7 shows the restraint means including a housing 60 adapted to be attached to housing 20. This housing incorporates a plurality of cylinders 61, one for each position of the coded scheme. Each of these cylinders includes a piston 62 which is integrally attached to a repsective pin 36, the pin comprising the engagement means adapted to engage the restraint means on the card. These pins are axially movable along an axis 63 which is laterally disposed with repsect to the data bearing cards. It will be seen that these are double-acting piston-cylinder combinations, and that at each side there is a supply conduit 64, 65. A four-way valve 66 is provided which receives fluid from a source 67 such as a pressure flask or a compressor and is also adapted to exhaust through a vent 68 to atmosphere. In the position shown in FIG. 7, the four-way valve which is electrically actuated is supplying pressure to the left hand face of piston 62 so as to force the pin to the right while the right hand side of the cylinder is vented through vent 68. Were the four-way to be rotated 90° clockwise, then pressure would be applied through conduit 65, and conduit 64 would be vented, thereby reverising the conditions.

Leads 69 receive coded signals adapted to set each of these restraint means to the coded position, which is to say in or out for each member for each of the pairs, thereby to accomplish the retention or release arrangements heretofore referred to. These arrangements are made before valve 53 is opened. In FIG. 6, all restraint means are shown withdrawn for simplicity in illustration.

The operation of the system should be evident from the foregoing. With the entire stack of cards in the holder, the pressure source is turned on so as to supply pressure to the conduit. The presence of the ditherer is entirely optional, although it has been found that this aids in maintaining the stack in a "live" condition, free from stick-slip effects. With either of the systems of FIG. 6 or 8, the static effect remains as shown on either of segments 45 and 46 of the graph of FIG. 9. The restraint means are adjusted so that the code number of the card to be released is fed into the various ones of cylinders 60 so that pins 36 are either retracted or inserted as appropriate. Then, after this is accomplished, valve 53 is opened and, in a burst, air enters into the power chamber and by exerting the additional pressure as exemplified by segment 47 of the curve in FIG. 9, blows the free card out of the stack. This card may thereafter be treated in the computer or otherwise, and then returned to the stack, by which time the pressure will have been dropped to the rest condition, and all engagement means will have been withdrawn. The sequence is then repeated. This device can function at rates on the order of five to six sequences per second, using cards as long as twelve inches. The order in which the card is returned to the holder is of no interest, because this coding signal is generally adaptable to any order of card assembly.

As to the cards, it is evident that, because they operate essentially in a piston relationship with each other and with the holder, there must be substantial areas of their abutting faces which will make a fluid seal as the higher pressure is exerted. Were the pressure simply to leak out to atmosphere at an excessive rate, then the device would not function properly. However, with a flat card coated with magnetic material, the device is entirely a rectangular parallelepiped. Should a center portion be relieved so as to receive further information-bearing media such as much thinner microfilm segments and the like, still there will be an ample surface-to-surface engagement of the adjoining cards such that the leakage past the same will be so small as to be of no functional disadvantage.

This invention thereby provides a quick acting, easily controllable technique and means for selecting a card from a static holder, delivering it to a system where the data is extracted, and returning it to the system in random order which does not depend on entire surface uniformity of the cards nor upon inertial or axial motion effects of either the card or of the holder which holds it in the repose condition.

This invention is not to be limited by the embodiments shown in the drawings and described in the description which are given by way of example and not of limitation, but only in accordance with the scope of the appended claims.

What is claimed is:

1. Apparatus for selecting a designated card from among a stacked group of cards and ejecting the designated card along an ejection axis, each said card having a dimension of length, width and thickness, with a pair of parallel edges lying parallel to the ejection axis, a pair of spaced-apart parallel faces lying parallel to the ejection axis and bounding at least a portion of the region between said edges, the cards being stacked in face-to-face contiguity with the said edges aligned, each said card incorporating therein retention means respective to itself, said apparatus comprising: a holder for holding said stack comprising four joined wall members lying parallel to the ejection axis, a closure member closing one end of the structure formed by the wall member; support means attached to the inside of the holder and spaced inwardly of said closure member for supporting said stack based on said support means, whereby to form an open-ended holder in which the cards lie in close but not binding relationship with the wall members and spaced from said closure member, and form with said members adjacent to the closure member a power chamber; a conduit entering said holder into said power chamber; valve means for controlling the passage of gas under pressure through said conduit from a source of said gas; conduit means bypassing said valve means for supplying said gas to said power chamber at a pressure to provide a continuous force which will maintain said stack of cards in a nearly weightless condition; restraint means connected to the holder including a plurality of engagement means, said engagement means being adapted to engage respective ones of said retention means; and selector means connected to the restraint means for selecting and causing engagement means to engage respective retention means which will restrain to the holder all but the designated one of said cards, whereby passage of gas under suitable pressure into the power chamber forces the designated card out of the holder.

2. Apparatus according to claim 1 in which each of the engagement means is a pin axially movable laterally relative to the ejection axis.

3. Apparatus according to claim 2 in which each of the restraint means comprises a cylinder connected to the holder, and a piston slidably fitted in said cylinder, the piston and pin being connected to each other.

4. Apparatus according to claim 2 in which the selector means includes switch means determining the axial position of the pin.

5. Apparatus according to claim 4 in which each of the restraint means comprises a cylinder connected to the holder, and a piston slidably fitted in said cylinder, the piston and pin being connected to each other.

6. Apparatus according to claim 5 in which the switch means comprises a valve adapted to pass pressure to either face of the piston.

7. Apparatus according to claim 1 in which pulsating means is disposed in said conduit to provide a pulsating gas stream to said power chamber.

References Cited

UNITED STATES PATENTS

| | | | |
|---|---|---|---|
| 2,169,050 | 8/1939 | Johnston | 129—16.1 |
| 2,524,918 | 10/1950 | McKeown | 129—16.1 |
| 2,722,676 | 11/1955 | Begun. | |
| 2,807,728 | 9/1957 | Kilburn et al. | 129—16.1 X |
| 3,228,130 | 1/1966 | Novak | 129—16.1 X |
| 3,291,133 | 12/1966 | Glaser et al. | 129—16.1 |
| 3,334,785 | 8/1967 | Grabowski et al. | 129—16.1 X |
| 3,335,728 | 8/1967 | Irasek | 129—16.1 |

JEROME SCHNALL, *Primary Examiner.*